US012631439B2

(12) United States Patent
Jensen et al.

(10) Patent No.: US 12,631,439 B2
(45) Date of Patent: May 19, 2026

(54) CMM WITH TUNABLE FOCAL LENS

(71) Applicant: HEXAGON INNOVATION HUB GMBH, Heerbrugg (CH)

(72) Inventors: Thomas Jensen, Rorschach (CH); Johan Stigwall, St.Gallen (CH); Frank Przygodda, Lindau (DE)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 0 days.

(21) Appl. No.: 18/759,869

(22) Filed: Jun. 29, 2024

(65) Prior Publication Data

US 2025/0003732 A1 Jan. 2, 2025

(30) Foreign Application Priority Data

Jun. 29, 2023 (EP) .................................... 23182302

(51) Int. Cl.
*G01B 11/00* (2006.01)
*G01B 11/24* (2006.01)

(52) U.S. Cl.
CPC ............ *G01B 11/005* (2013.01); *G01B 11/24* (2013.01)

(58) Field of Classification Search
CPC .... G01B 11/005; G01B 11/24; G01B 21/042; G01B 11/007; G02B 3/14; G02B 26/004
USPC ........................................................ 356/601
See application file for complete search history.

(56) References Cited

U.S. PATENT DOCUMENTS

| | | | |
|---|---|---|---|
| 5,388,342 | A | 2/1995 | Garau et al. |
| 2018/0324401 | A1 | 11/2018 | Sheffield et al. |
| 2020/0151907 | A1 | 5/2020 | Sugita |

FOREIGN PATENT DOCUMENTS

| | | |
|---|---|---|
| DE | 43 25 347 A1 | 2/1994 |
| EP | 2 916 099 B1 | 9/2020 |
| EP | 2 895 304 B1 | 11/2021 |

OTHER PUBLICATIONS

Extended European Search Report dated Dec. 1, 2023 as received in Application No. 23182302.2.

*Primary Examiner* — Md M Rahman
(74) *Attorney, Agent, or Firm* — Maschoff Brennan

(57) ABSTRACT

A coordinate measuring machine for measuring a number of measuring points on a surface, the coordinate measuring machine comprising a base, a probe head with an optical probe, a machine structure for linking the probe head to the base, at least one drive mechanism for providing movability of the probe head relative to the base, at least one encoding unit, an optical overview sensor unit arranged at the machine structure and a controlling and processing unit adapted at least for controlling the drive mechanism. The optical probe comprises an optical detection unit, in particular a sensor, a variable focal length lens capable of modifying its focal length and an actuating unit configured and arranged relative to the variable focal length lens so that the actuating unit provides setting and varying the focal length as a function of a controlling signal.

16 Claims, 3 Drawing Sheets

CMM WITH TUNABLE FOCAL LENS

FIELD

The present disclosure relates to a coordinate measuring machine (CMM) comprising an optical probe having a tunable focal lens (liquid-lens) for the focusing. The focal length can be adjusted based on predetermined surface information derived on side of the CMM.

BACKGROUND

A coordinate measuring machine (CMM) is a machine configured to measure the 3D coordinates of certain points, in particular the whole surface topography, of a work piece. Surface might mean a 2D exterior of the work piece, but can equally mean a surface region, i.e. region of finite thickness. For brevity and transparency reasons from here on surface will be used as a 2D surface, the specific features of measuring a surface region may be applied accordingly.

CMM's are important in various industries e.g. in production measurement, quality control or reverse engineering. They may be utilized for example to determine deviations of the geometry of a manufactured product from the design model, e.g. to determine whether the deviations are within the manufacturing tolerance. Such measurements are typically carried out automatically or semi-automatically based on a computer generated or operator selected measuring path wherein such measuring path is provided with respect of the design model.

Another application of a CMM which is gaining more prominence is the reverse engineering of an object. For such applications no design model exists, but an operator commands the 3D movement of the probe head by manual steering commands utilizing e.g. a jog box/joystick. Alternatively the operator may directly steer the handheld sensor.

Typically a CMM has a main structure, a probing system, a data collection and data processing system.

The main structure usually comprise a set of actuators responsible for positioning the probing system. One widespread example of a CMM is a 3-axis system. E.g. DE 43 25 347 discloses such a CMM system. Here the main structure includes a basis with a measuring table and a movable frame. The work pieces might be positioned or mounted on the measuring table. The movable frame is mounted on the basis such that it can be moved along a first axis, the frame comprise an arm mounted such that is can be moved along a second axis perpendicular to the first axis. The probing system comprises the probe head mounted on the arm such that it can be moved along a third axis, which is perpendicular to the first and second axes. Such a construction enables the steering of the probe head in all three dimensions allowing to measure the relevant 3D coordinates of an object. Contemporary 3-axis systems often further comprise components, e.g. stacked rotary tables, to provide 5 degrees of freedom regarding the relative pose of the probe head and work piece.

Another typical embodiment of the CMM is the so-called articulated arm coordinate measuring machine (AACMM). An AACMM comprise a base to be stationed and an arm comprising multiple arm segments connected by articulations. The articulations provide movability to a movable end of the arm which is opposed to the base and wherein a probe head can be attached. The probe head is typically manually guided by an operator. Due to its design principles such a system is less accurate than the above mentioned 3- or 5-axis system, on the other hand it offers higher flexibility. E.g. EP 2 916 099 B1 discloses such an AACMM instrument.

The probing system of the CMM might be based on contact or non-contact techniques. In the first case a mechanical probe, typically realized as a stylus, achieves direct mechanical contact with the work piece and the probe is guided through a given measuring path, while the endpoint coordinates of the stylus are derived from sensor readings, e.g. encoder readings, regarding the state of the CMM. Non-contact techniques can be based on projecting a primary measuring beam on the work object and registering a secondary beam emanating from the object surface region. One advantage of non-contact techniques is that a damage to the work object is less likely due to the lack of mechanical contact. Furthermore, non-contact methods allow a parallel acquisition of an extended area, unlike to the stylus-based methods where only the coordinates of a single point are registered.

To obtain high quality data the CMM measurement can be performed under steady-state measurement conditions. For contact probes this might be provided e.g. by keeping the contact and/or the friction force between the stylus and the work object within a certain range. In contrast to the contact probes such simple feedback methods are not available for automatically guiding a non-contact probe. This problem is particularly aggravated in the case of a manual measurement of an unknown work object, since in this case it is not even possible to provide a sufficiently good approximation path based on a digital model or previous measurement data.

Deriving a digital model of a work piece to be measured and a respective measuring path is typically quite complex and time consuming. Moreover, for measuring the work piece according to the measuring path requires to detect an orientation of the work piece and to align the digital model according to a current orientation. This results in even more complex measuring procedures.

SUMMARY

Therefore, the object of the present disclosure is to provide a coordinate measuring machine which provides to reduce the drawbacks of above.

A further objective of the present disclosure is to provide a coordinate measuring machine providing a more efficient measurement workflow, in particular by making use of a pre-measurement step.

The present disclosure is based on the idea of providing an optical probe head of a CMM with a sensor and a fast focusable (e.g. liquid) lens to acquire surface information in an image-based manner. Such variable focal length lens provides to acquire the surface information in a very efficient way, in particular while moving the probe head over the surface (on-the-fly). The focal length of the optical system can be adjusted according to a distance between the probe head and a particular measuring point or region. Such adjusting of the focal length can be provided comparatively fast while moving from a measuring point to the next measuring point. Preferably, adjusting can be provided in a continuous manner during movement of the probe head along a measuring path.

For adjusting the focal length, height information about particular distances for particular measuring points is needed. The CMM is configured to provide respective height information for a measuring point and/or for the surface to be measured. The CMM comprises an additional optical overview sensor unit (besides the optical probe head) to derive the height information, in particular to derive topographical data related to the surface.

Such optical overview sensor unit is arranged at the machine structure, e.g. at the frame or arm of the CMM, and configured to acquire surface information. The optical overview sensor unit can be embodied as a camera, a plurality of cameras, a triangulation sensor, a range camera or the like.

The surface information, e.g. height information or a height map, can be derived by capturing at least one image, preferably a plurality of images, related to the surface to be measured. The surface information may then be derived by image processing.

As for example, the optical overview sensor unit comprises one camera and the camera is moved over the surface by means of moving the machine structure. Precise information concerning the positions of the camera with respect to the base, in particular with respect to the surface, can be determined by utilizing the sensors or encoders of the CMM. The camera is controlled to acquire a set of images and precise position information is gathered and assigned to each of the image of the set of images. The surface information can be derived by applying a photogrammetric approach and processing the image information together with the assigned position information. Such photogrammetric approach can include any processing method which is capable of reconstructing 3D geometry from a set of 2D images, for example also inverse rendering approaches and AI-based reconstruction such as neural radiance fields (NeRF) can be used. That way, topographical data concerning the surface can be computed.

Therefore, the present disclosure relates to a coordinate measuring machine for measuring a number of measuring points on a surface of an object. The coordinate measuring machine comprises a base, a probe head with an optical probe and a machine structure, in particular a portal- (bridge-) or Scara-type machine structure, with structural components for linking the probe head to the base. The CMM can also be embodied as a horizontal arm CMM or moving-table bridge CMM (e.g. Optiv and PMM-C, and gantry CMMs). A Scara-type machine is a type of industrial robot. The acronym SCARA stands for Selective Compliance Assembly Robot Arm or Selective Compliance Articulated Robot Arm.

The base may be provided as a measuring table, e.g. made from granite, or as a physical reference point, e.g. a pedestal or set-up position of the CMM.

The probe head can be provided as an element for carrying a measuring probe, e.g. a tactile or an optical probe, or a tool. The probe head can further be embodied to provide rotation of the measuring probe about one or two axes. In case the CMM is built as a portal (3-axes) CMM the probe head is preferably mounted to a z-ram which provides movability of the probe head in z-direction.

The optical probe can preferably be arranged at the probe head in order to provide measurement with the optical probe of a distance to an object or structure (1D data), a lateral dimension of an object or structure (2D data), or both at the same time (3D data). By that, the optical probe can be moved relative to the base. The optical probe may be embodied as a camera, a triangulation sensor unit, a confocal measuring unit, a white-light measuring unit or any other sensor unit capable to acquire 1D, 2D, or 3D data, e.g. for particular measuring points.

The optical probe can comprise a camera comprising a telecentric lens with a tunable lens element, an image sensor with control electronics and an illumination for the object. The illumination might be a coaxial top light coupled into the telecentric lens by a beam splitter or an external ring light. Typically the optical probe has a lateral object resolution of a few microns, while, for comparison the resolution of the optical overview sensor can be a factor hundred less.

As indicated above, the machine structure may comprise particular elements which are movable relative to each other to provide positioning the probe head within a measuring volume of the CMM. Relative movability should be understood as relative linear or relative rotational movement, but however should not be limited to a particular design of a CMM but should also cover CMMs and robots known from prior art.

The coordinate measuring machine also comprises at least one drive mechanism for providing movability of the machine structure and of the probe head relative to the base. The drive mechanism can be provided as a motor, step-motor, actuator etc. In particular, the coordinate measuring machine can comprise at least three driving means which are arranged so that the probe head can be moved in three directions, e.g. in the directions of a x-axis, a y-axis and a z-axis.

The coordinate measuring machine also comprises at least one encoding unit which is configured to provide positional data concerning a position of the machine structure and/or of the probe head relative to the base. In particular, the coordinate measuring machine comprises a set of encoders which provide relative positions of machine components in particular coordinate axes. The at least one encoding unit may be provided by a linear encoder, a rotational encoder or a sensor unit capable to measure distances between two points.

The coordinate measuring machine comprises an optical overview sensor unit which is arranged at the machine structure and which is configured to acquire surface information, in particular in the form of image data. The optical overview sensor unit provides a field of view which is significantly greater than the field of view of the optical probe.

Further, a controlling and processing unit is provided at least for controlling the drive mechanism.

The optical probe comprises an optical detection unit, in particular a sensor, a variable focal length lens capable of modifying its focal length, and an actuating unit configured and arranged relative to the variable focal length lens so that the actuating unit provides setting and varying the focal length as a function of a controlling signal.

The actuating unit is to be understood as an element which provides the setting of the focal length. The term "actuating unit" is not limited a mechanical unit but also may cover electronic-based solutions. Moreover, the actuating unit does not necessarily have to be provided as a separate element but may be integrated into the variable focal length lens. As for example, an electro-wetting liquid lens, a liquid crystal spatial light modulator or a MEMS mirror array each can comprise an actuating unit of a particular kind.

The controlling and processing unit comprises a measuring functionality configured to derive auxiliary distance information and configured to derive effective surface information for measuring points. The auxiliary distance information is derived by controlling the optical overview sensor unit as to acquire surface information related to at least one point of the number of measuring points and by determining the auxiliary distance information related to the at least one measuring point based on the surface information. The surface information may comprise image data or distance data, e.g. a point cloud providing distance information for a number of surface points.

A controlling signal is derived based on the auxiliary distance information.

The effective surface information is derived by providing an adjusted measuring state of the optical probe by applying the controlling signal to the actuating unit and thus providing a distance-related focal length. The effective surface information for the at least one measuring point is determined by means of the optical probe in the adjusted measuring state.

In particular, the effective surface information can be provided as an image or a set of images of the surface. Such approach of measuring the object is typically used for so called vision machines. The object can be scanned with the optical probe and a series of images can be acquired to represent the surface of the object.

In particular, the effective surface information can provide distance information.

The optical probe could be a 2D camera with a small field of view. Such a (microscopic) camera can have a very small depth of field and can make use of the tuneable lens to keep the surface to be measured in focus.

In contrast, the optical overview sensor unit can have a large field of view and large depth of field.

In particular, the measuring functionality can be configured so that auxiliary surface information is provided by means of the optical overview sensor, wherein the auxiliary surface information can preferably comprise image data related to the surface. In particular, the effective surface information provides significantly greater accuracy than the auxiliary surface information.

In other words, the auxiliary distance information can be acquired by means of the optical overview sensor unit arranged at the machine structure to provide (coarse) surface data in order to allow controlling of the focal length of the variable focal length lens as a function of that surface data. Accurate surface data can thus be derived with the optical probe by respective adjustment of its focal length, in particular based on the primarily available auxiliary distance data.

Hence, the disclosure can provide to reach the depth of focus of the optical probe by help of the accuracy of the auxiliary distance information, so that e.g. sharp 2D images of the object can be acquired with the probe. This is advantageous for "vision machines" or similar applications, e.g. detecting borehole diameters or dimensions of components. This also relates to measuring of 2D objects on flat planes (sheet metal, electrical boards, etc.).

In one embodiment, the measuring functionality can be configured so that deriving the auxiliary distance information comprises controlling of the optical overview sensor unit as to acquire second surface information related to a second of the number of measuring points. Second auxiliary distance information related to the second measuring point can be determined based on the second surface information.

In one embodiment, the measuring functionality can be configured so that deriving the effective surface information comprises deriving of a second controlling signal based on the second auxiliary distance information, providing a second adjusted measuring state of the optical probe by applying the second controlling signal to the actuating unit and thus providing a distance-related focal length, and determining second effective surface information for the second measuring point by means of the optical probe in the second adjusted measuring state.

According to one embodiment, the measuring functionality can be configured to execute or perform the deriving of the auxiliary distance information before deriving the effective surface information.

In one embodiment, the measuring functionality can be configured to provide—by means of the drive mechanism— the optical overview sensor unit at a first position relative to the base and to derive the auxiliary distance information based on surface information acquired at the first position.

According to an embodiment, the measuring functionality can be configured to provide—by means of the drive mechanism—the optical overview sensor unit successively at least at a first and at a second position relative to the base, derive the auxiliary distance information by acquiring surface information related to the one point of the number of measuring points at least at the first and the second position and determine the auxiliary distance information related to the one measuring point based on the surface information acquired at least at the first and at the second position.

In other words, the auxiliary distance information can be derived by different approaches but with the same capturing device (optical overview sensor unit). The auxiliary distance information may be determined by capturing one image of the surface, in particular by utilizing a projection of a light pattern and capturing an image of the illuminated surface. By that, the auxiliary distance information can be derived as triangulation-based distance data. The light pattern can be a single laser line, multiple laser lines, random dots, a laser speckle pattern, a random pattern or a fringe projection (multiple patterns in sequence). Alternatively or additionally, the auxiliary distance information may be determined by capturing a number of images from different poses and processing the images using a photogrammetric approach. By that, a point cloud can be derived which represents the topography of the captured surface. Further, a time-of-flight (TOF) camera or a LIDAR scanner can be provided as the optical overview sensor unit.

In one embodiment, the measuring functionality can be configured to derive positional data concerning the at least first position and second position of the optical overview sensor unit relative to the base by means of the encoding unit. The respective positional data can be assigned to the respective surface information for the at least first and second position of the optical sensor, and the auxiliary distance information can be determined by processing the positional data and surface information.

In other words, the measuring functionality can be embodied to make use of encoder outputs of the CMM in order to determine respective positions (and poses) of the optical overview sensor unit when acquiring surface information. This enables to provide highly accurate photogrammetric image processing by using one single camera of the optical overview sensor unit at different positions and precise CMM position data. As for example, a stereo base for photogrammetric image processing can be derived based on the CMM position data.

In particular, the optical overview sensor unit can comprises at least one camera, in particular two cameras, and the auxiliary distance information is provided as a height map by means of photogrammetric processing.

In one embodiment, the base can comprise a set of reference points with known positions, in particular provided by threads (e.g. threaded inserts or threaded holes) of a measuring table (base) or by tapped holes.

At least one of the reference points can be covered by the acquired surface information and the position of the at least one reference point is processed for determining the auxiliary distance information. Alternatively or additionally, the position of the at least one reference point can be processed for calibrating the optical overview sensor unit.

Since a captured image can be referenced relative to the coordinate system of the CMM by means of the covered reference point, this provides stable and precise measurement of the surface.

In particular, extrinsic parameters of the optical overview sensor unit can be calibrated or updated by processing the position of the at least one reference point. Extrinsic parameters describe the outer orientation of the optical overview sensor unit (camera), i.e. the position and orientation of the optical sensor unit in a coordinate system of the CMM.

In one embodiment, at least one of the reference points can be covered with the acquired surface information and the position of the at least one reference point can be processed for calibrating and/or updating a calibration of the optical overview sensor unit. In particular, the position of at least one of the reference points is processed with each measurement, e.g. with each deriving of auxiliary distance information. By that, drifts due to temperature variations or due to other external influences can be compensated, in particular continuously.

The position of at least one or of a plurality of the set of reference points on the base (measuring table) can be pre-know and provided in a database. Alternatively or additionally, the positions can be derived (measured) by means of the coordinate measuring machine, e.g. by use of a tactile probe.

In an embodiment, the controlling and processing unit can comprise an auxiliary-measuring functionality which is configured to provide the auxiliary distance information by moving the optical overview sensor unit over the surface, acquiring surface information related to the surface at a plurality of positions provided by moving the optical overview sensor unit and determining auxiliary distance information related to the surface based on the surface information, wherein the auxiliary distance information comprises particular distance information for each of the number of measuring points.

In particular, the auxiliary-measuring functionality can be a sub-functionality of the measuring functionality and is executed by the measuring functionality.

Moving of the optical overview sensor unit can be realized by continuously moving the optical overview sensor unit and acquiring surface information can respectively be provided by capturing images during moving the optical overview sensor unit at particular positions or with defined intervals. The positions at which the images are captured can be determined by means of CMM sensors (e.g. encoders).

In one embodiment, the controlling and processing unit can comprise an effective-measuring functionality configured to provide the effective surface information. The effective surface information can be provided by moving the optical probe over the surface according to a measuring path, wherein the optical probe is successively approached to a first and to a second measuring point.

A first controlling signal related to the first measuring point and a second controlling signal related to the second measuring point are received or derived.

In the course of approaching the first measuring point, a first adjusted measuring state of the optical probe by applying the first controlling signal to the actuating unit is provided, and the effective surface information for the first measuring point is determined by means of the optical probe in the first adjusted measuring state.

In the course of approaching the second measuring point, a second adjusted measuring state of the optical probe by applying the second controlling signal to the actuating unit is provided, and the effective surface information for the second measuring point is determined by means of the optical probe in the second adjusted measuring state.

The first and/or the second controlling signal can be received from a database or can be derived based on a measurement by means of the optical overview sensor unit in advance of performing the effective-measuring functionality, e.g. by executing the auxiliary-measuring functionality.

By above approach, for each of the measuring points a controlling signal can be provided which allows to adjust or re-adjust the focal length of a liquid lens when the respective measuring point is desired to be measured by the optical probe. By that, the required measuring parameters can be provided for each particular measuring distance (measuring point). The measuring distance can in particular be understood to be a distance between the surface of a work piece (measuring point) to be measured and the optical probe.

Since suitable measuring parameters can be provided for each measuring point (within a defined measuring range in z-direction), the need for an additional movement of the optical probe in z-direction, e.g. in order to provide a suitable distance to measure a measuring point, can be avoided. This results to higher measuring speeds.

According to an embodiment, the effective-measuring functionality can be configured to continuously move the optical probe over the surface according to the measuring path and to provide applying the first and/or the second controlling signal and determining the effective surface information for the first and/or second measuring point in the course of, in particular during, moving the optical probe. Hence, an on-the-fly measurement can be performed which leads to even faster measuring and less measuring time.

The present disclosure is not limited to obtaining a specific type of surface information. The evaluation might be carried out by a computing unit physically separated from the CMM, in particular a remote computing unit. Such computing units comprised by a controller in the sense of the present disclosure.

In one embodiment, for acquiring the effective surface data, the optical probe with variable focal length (e.g. by a tuneable lens) can be controlled to take 2D images of the object. The variable focal length is controlled so that the surface of the object is in focus. The camera captures images that provide accurate 2D information about features of the object.

Height data (e.g. 3D coordinates) of the object acquired with the optical overview sensor unit may have limited accuracy. However, as long as the uncertainty of the height information of the object is below the depth of focus of the optical probe, images taken with the optical probe are sharp.

However, since the typically used lens system (here with variable focal length lens) for a vision machine is embodied as a telecentric lens system, no accurate 3D data of the object can be derived from the sharp 2D images. Images taken at different lateral positions have the same perspective, a 3D reconstruction like with the optical overview sensor (endocentric lens) may not be possible. Alternatively, in case one would use a endocentric lens for the optical probe, the risk of lower accuracy in lateral object dimensions is much higher due to large change in optical scale with distance.

In one embodiment, to derive distance information with the optical probe having a telecentric lens system a (e.g. periodic) variation of the focal length can be applied. The variation can be provided by respectively varying the controlling signal. The focus change is preferably controlled to be periodic (wobbling).

The focus variation can be for example a periodic change of the tuneable lens in form of a sinusoidal or a saw-tooth function but also a non-periodic but well-defined function.

In addition to the controlled change of the focal length the lateral movement of the optical probe (by the CMM movement) and the image acquisition can be controlled in a way that the fields of view (FOVs) of several successive images overlap. The combination of the focus change and the overlapping images result in the fact, that a feature of the surface to be measured can be imaged in multiple acquisitions with different focus settings.

Based on above, the sharpest image can be selected for further image processing and determination of 2D feature coordinates.

Furthermore, the sharpness of the images can be determined as a function of the z-distance e.g. by contrast evaluation. This allows for the calculation of the distance of the feature in z-direction (1D coordinate) with higher accuracy. The z-distance can be calculated by interpolating.

In particular, the focus shift can be chosen to be larger than the depth of contrast range. By that, a contrast maximum can be determined. To calculate a contrast maximum in minimum three images are required for every object point or feature.

Therefore, in one embodiment the optical probe can comprise a telecentric lens system and the controlling and processing unit can comprise a distance-measuring functionality configured to derive distance data for at least one point of the number of measuring points. The distance data is derived by moving the optical probe over the surface according to the auxiliary distance information, varying the focal length during moving of the optical probe by providing the controlling signal as a modified controlling function and capturing a set of at least three images during moving of the optical probe as the effective surface information, wherein varying the focal length and capturing the images are adjusted to each other so that each image covers the at least one point of the number of measuring points and each image provides a different focus level for the at least one point of the number of measuring points.

A distance image is determined of the set of at least three images by image processing using a contrast criterion, and the distance is derived based on the focal length applied for capturing the distance image, in particular by interpolating the focal lengths applied for capturing the set of at least three images.

According to an alternative embodiment of how to derive distance information with the optical probe the optical axis to the optical probe can be tilted relative to the surface to be measured, i.e. the optical axis is not perpendicular to the surface, in particular is not oriented according to a surface normal. In particular, the optical probe is tilted.

The tilt can be chosen in a way that a feature at the object can be imaged while the optical probe is moved relative to the surface in multiple successive acquisitions with different focus/defocus. The sharpest image of a particular feature can be selected for further image processing and determination of 2D feature coordinates. The sharpness can be determined as a function of the z-distance which allows for the calculation (e.g. by interpolation) of the accurate distance of the feature in z-direction (1D coordinate).

Here, the focal length of the tuneable lens can also be wobbled or can be allowed to follow the assumed topography of the surface. Such assumed topography can be determined as auxiliary surface data (auxiliary distance information) by measurement with the optical overview sensor unit. The tilt is preferably be chosen so that the height difference of the focus relative to the surface across the field of view is sufficient for a substantial contrast change.

Therefore, in one embodiment the effective-measuring functionality can be configured to provide tilting of an optical axis of the optical probe relative to a normal related to the first measuring point and relative to a normal related to the second measuring point. Tilting can be provided by means of the machine structure and the drive mechanism. In particular, the orientation of the optical probe is controlled to be tilted relative to a surface normal.

At least one tilted image can be captured which represents the effective surface information for each measuring point. By that, a common feature of the surface can be covered with each tilted image, wherein each tilted image provides the common feature with different sharpness (due to different defocus because of the tilting).

A best-sharpness value can be determined for the common feature based on the tilted images. Distance information can be derived based on the controlling signals applied for capturing the tilted images and based on the best-sharpness value.

The disclosure also relates to a controller for a coordinate measuring machine. The coordinate measuring machine comprises a base having a set of reference points with known positions, in particular provided by threads of a measuring table, a probe head with an optical probe, and a machine structure, in particular a portal or Scara-type machine structure, with structural components for linking the probe head to the base.

The coordinate measuring machine further comprises at least one drive mechanism for providing movability of the machine structure and of the probe head relative to the base, at least one encoding unit configured to provide positional data concerning a position of the machine structure and/or of the probe head relative to the base, and an optical overview sensor unit arranged at the machine structure and configured to acquire surface information, the optical overview sensor unit provides a field of view which is significantly greater than the field of view of the optical probe.

The controller being at least configured to control the drive mechanism.

The controller further is configured to capture at least one reference image which covers at least a part of a calibration target provided on the base and at least one of the reference points. Extrinsic parameters for the optical overview sensor unit relative to the calibration target are computed by processing the at least one reference image. A sensor image position of the at least one of the reference points is derived based on the at least one reference image, the sensor position is provided as a coordinate in a camera coordinate system of the optical overview sensor unit.

A reference position for the at least one of the reference points is received or derived, the reference position is provided as a coordinate in a CMM coordinate system of the coordinate measuring machine. The camera coordinate system and the CMM coordinate system are referenced by processing the sensor position and the reference position.

The disclosure also relates to a method for calibrating an optical overview sensor unit of a coordinate measuring machine of above. The method comprises providing a calibration target, taking a set of images of the calibration target from different poses by means of the optical overview sensor unit, and deriving extrinsic parameters for the optical overview sensor unit by processing the set of images.

Further, the calibration target is provided on the base of the coordinate measuring machine, wherein the base is provided as a measuring table having a set of reference points with known positions, in particular provided by threads of a measuring table, and at least one reference image which covers at least a part of the calibration target and at least one of the reference points is captured.

Extrinsic parameters for the optical overview sensor unit relative to the calibration target are computed by processing the at least one reference image, and a sensor image position of the at least one of the reference points is derived based on the at least one reference image, the sensor position is provided as a coordinate in a camera coordinate system of the optical overview sensor unit.

A reference position for the at least one of the reference points is received or derived (e.g. by in-advance measurement), the reference position is provided as a coordinate in a CMM coordinate system of the coordinate measuring machine, and the camera coordinate system and the CMM coordinate system are referenced by processing the sensor position and the reference position.

The disclosure also relates to a computer program product, which, when executed by a computing unit and/or a controller, causes the automatic execution and controlling of the steps of the of above.

BRIEF DESCRIPTION OF THE DRAWINGS

By way of example only, specific embodiments will be described more fully hereinafter with reference to the accompanying figures, wherein.

DETAILED DESCRIPTION

Figure 1:
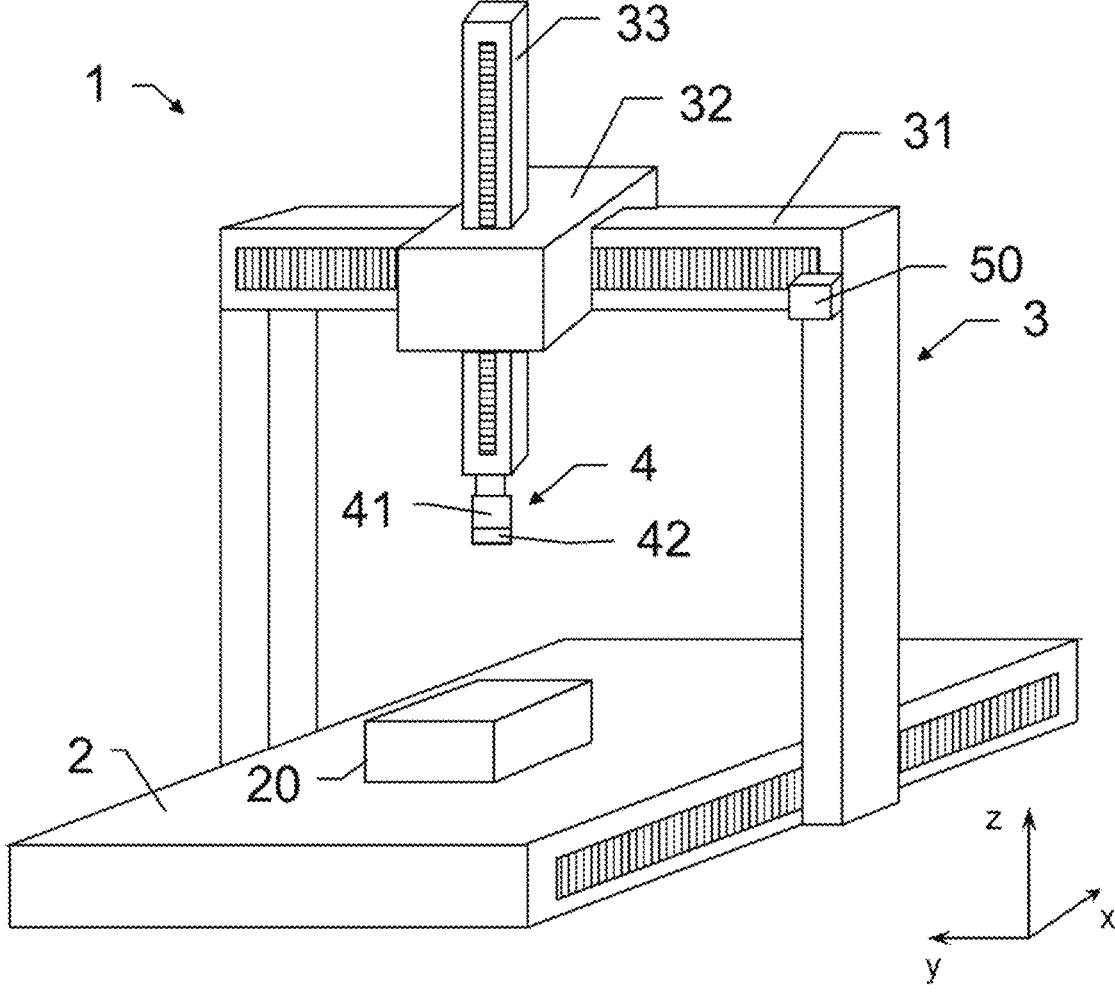
FIG. 1 shows the schematics of an embodiment of a CMM as a three-axis machine.

FIG. 1 shows a schematic depiction of an embodiment of the CMM 1 as a three axis CMM. The CMM 1 comprises a measuring table 2 to support the work piece 20. The measuring table 2 provides the base of the CMM. While not shown in the depicted embodiment, the measuring table 2 might comprise elements aiding the positioning of the work piece 20. The measuring table 2 might also comprise further elements to clamp or otherwise fix, in particular by a vacuum chuck, the work piece 20. Such further elements might be temporarily mounted to the measuring table 2.

The CMM comprises a machine structure 3 embodied as movable frame mounted on the measuring table 2 such that it can be moved along a first axis, in the here depicted embodiment the x-axis, by a first set of motors. The machine structure 3 comprise an element which spans the measuring table 2, a so called bridge 31. Further, the CMM comprises a carrier 32 which is mounted moveable along the bridge 31. The mounting of the carrier 32 is provided such that it can be moved along a second axis perpendicular to the first axis, in the here depicted embodiment the y-axis.

The carrier carries a further element 33 which is arranged and configured to be moved along a third axis, in the here depicted embodiment the z-axis. Such element 33 may further be called (z-) ram or rod.

Furthermore, the CMM comprises a drive mechanism for providing movability of the machine structure 3 and of the probe head 4 relative to the base 2. The drive mechanism can comprise particular drive units of providing relative movement of the particular components of the machine structure 3, e.g. a motor which provides movement of the whole machine structure 3 (bridge 31) relative to the base 2, a motor which provides movement of the carrier 32 relative to the bridge 31 and a motor which provides movement of the z-ram 33 relative to the carrier 32.

The CMM also comprises at least one encoding unit configured to provide positional data concerning a position of the machine structure and/or of the probe head relative to the base. The encoding unit may comprise several encoders which provide information about positions of the bridge 31 relative to the base 2, of the carrier 32 relative to the bridge 31 and of the z-ram relative to the carrier 32.

A probe head 4 is mounted on the end of the z-ram 33. The probe head 4 comprises an optical probe 41. The optical probe 41 is configured to acquire data which is related to the surface of the work piece 20. Hence, the optical probe 41 comprises a sensor (optical detection unit) to detect an optical signal, e.g. light or measuring light reflected at the surface of the work piece 20.

In one embodiment, the CMM can comprise additional joints and/or actuators to provide additional degrees of freedom of moving the probe head 4. For instance, there may be arranged a rotational joint to provide rotation of the probe head 4 and/or of the optical probe 41.

In one embodiment the optical probe 41 can comprise a light emitting unit for illuminating the work piece 20 and/or for projecting measuring light, e.g. dot, line or pattern, towards the work piece 20. The sensor is configured to detect a reflection of the light emitted by the light emitting unit. By that, as for example, triangulation-based surface measurement can be available. As a result, height information related to the surface of the work piece 20 can be derived.

In one embodiment the optical probe 41 can be provided by a triangulation sensor having a light emitting unit, e.g. a laser, laser diode, LED or OLED, and the optical detection unit, e.g. CMOS or CCD.

The optical probe 41 comprises a variable focal length lens 42 capable of modifying its focal length, and an actuating unit configured and arranged relative to the variable focal length lens so that the actuating unit provides setting and varying the focal length as a function of a controlling signal. This variable focal length lens 42 provides to manipulate the focal length of the optical system of the optical probe 41 in a way to provide acquisition of optical information with an adjusted focal length according to a current distance of the optical probe 41 relative to the surface or relative to a particular measuring point at the surface.

Since a surface of a work piece 20 to be measured typically is not plane but comprises elevations and/or depressions, the distances of different measuring points differ respectively. In other words, the work piece 20 provides varying heights over its surface. This means that the focal length can respectively be adjusted when moving the probe head relative to the work piece 20 to provide and maintain an adjusted and suitable measuring condition. This way, a relative movement of the optical probe 41 and/or the probe head 4 in z-direction can be avoided or significantly be reduced. This results in faster and more efficient measuring of the work piece 20.

To provide suitable measuring conditions, information about heights of the object's 20 surface, e.g. a height map or topographic distribution, has to be available.

The CMM 1 comprises an optical overview sensor unit 50. The optical overview sensor unit 50 is arranged at the machine structure and configured to acquire respective auxiliary distance information. The optical overview sensor unit 50 provides a field of view which is significantly greater than the field of view of the optical probe 41.

A controlling and processing unit of the CMM comprises a measuring functionality configured to derive the auxiliary distance information. The auxiliary distance information is derived by controlling the optical overview sensor unit 50 as to acquire surface information related to at least one point of the number of measuring points. Based on the surface information the auxiliary distance information related to the at least one measuring point is determined.

According to the embodiment of FIG. 1, the optical overview sensor unit 50 is provided as a camera and the auxiliary distance information can be derived by moving the machine structure relative to the measuring table 2 in x-direction and capturing a number of images with the camera 50. The images can be processed with a photogrammetric approach. Machine positions can be derived for each captured image. Combined processing of the image data and position data allows to derive a height information concerning the surface of the object 20. Such height information can comprise a height map and is considered to be the auxiliary distance information.

The auxiliary distance information is used as an input for controlling the focal length of the variable focal length lens 42. The CMM 1 comprises an actuating unit which is arranged and configured relative to the variable focal length lens, in particular in the optical probe 41, so that the actuating unit can provide setting and varying the focal length as a function of a controlling signal. The controlling signal is derived based on the auxiliary distance information.

As for example, the variable focal length lens 42 is built as a liquid lens and the actuating unit provides to manipulate the curvature of the liquid lens, e.g. by pressing on the liquid lens or by pulling at the edge of the liquid lens.

Alternatively, the variable focal length lens 42 can be provided by an electro wetting device, by a device applying piezo-driven modification of an optical surface, by a tuneable acoustic gradient lens, or a device comprising MEMS mirrors.

The controlling signal can be provided as a function of the position of the optical probe 41 or of the position of the probe head 4, e.g. as a function of the CMM positions measured by position encoders.

The controlling signal can be applied and varied in a continuous manner during moving the probe head 4 e.g. in the x-y-plane over the object to be measured.

An adjusted measuring state of the optical probe 41 can thus be provided by applying the controlling signal to the actuating unit. The applied controlling signal is preferably related to a measuring point at the object 20, which measuring point is to be measured and relative to which the optical probe 41 is to be positioned. By that, a distance-related focal length can be provided.

In other words, the probe head 4 can be moved relative to the object 20 and the controlling signal is adjusted according to the position of the probe head 4 in the x-y-plane. By that, an adjustment of the z-position of the probe head 4 can be avoided and suitable measuring conditions can be provided by setting the focal length according to the previously determined auxiliary distance to the respective measuring point.

When the focal length according to the auxiliary distance is set, effective surface information for the at least one measuring point can be determined by means of the optical probe in that adjusted measuring state. In particular, the effective surface information provides significantly greater accuracy than the auxiliary distance information. The effective surface information may comprise an image, a particular distance to the measuring point, an intensity value related to a signal detected by the sensor, a position information related to an impinging position of measuring light on the sensor or an image position in an image captured by the optical probe.

As for an example, a measurement of the work piece 20 with the CMM 1 can be performed according to the following scheme. First, the undefined object 20 is provided on the measuring table 2. In a next step, the machine structure 3 is moved over the measuring table 2 in x-direction while a set of images is captured with the overview sensor unit 50. For each of the images a position of the sensor unit 50 is determined by means of the CMM internal position sensors, e.g. linear encoders. In particular, respective poses of the sensor unit 50 at each of the positions are derived. Each image is combined with the respective position.

The images and respective positions are processed using a photogrammetric approach, e.g. a stereo-photogrammetric approach. Respective stereo bases can be derived by using the positions of the sensor unit 50 at which the images to be processed were captured. The processing can be directed to derive particular positions and heights of particular measuring points to be measured. Alternatively or additionally, the processing can be performed to derive a current height map of the measuring table 2 or of at least the object 20. The respective auxiliary distance information can thus be derived as a point cloud.

The information about the height distribution e.g. over the entire measuring table 2 is used to control the movement of the probe head 4 and the focal length of the variable focal length lens 42.

In a next (accurate) measuring step now the probe head 4 is moved over the measuring table according to a measuring path. The measuring path may be derived on basis of the auxiliary distance information. The measuring path is preferably determined so that none or at least only minor movement of the probe head 4 in z-direction becomes necessary. Respective changes in distances between the optical probe 41 and the surface of the measuring table 2 and/or the object 20 along the measuring path are at least mainly adjusted by means of the variable focal length lens 42 to continuously provide suitable measuring conditions, e.g. by adjusting the focal length according to the changing distances to the measuring points.

This way, a set of accurate surface details or distance values for a plurality of measuring points can be collected during moving the probe head 4, i.e. without having to pause movement and perform a measurement when the probe head is still. In other words: the accurate surface or coordinate measurement can be provided on-the-fly.

As a result, the effective surface information for the measuring points is determined by means of the optical probe 41. The effective surface information may be provided as particular image data or distance values for each measuring point, as coordinates for the measuring points, or as image data, distance values or coordinates concerning the entire measuring table 2 or at least the object 20, in particular in the form of a point cloud.

Figures 2, 3:
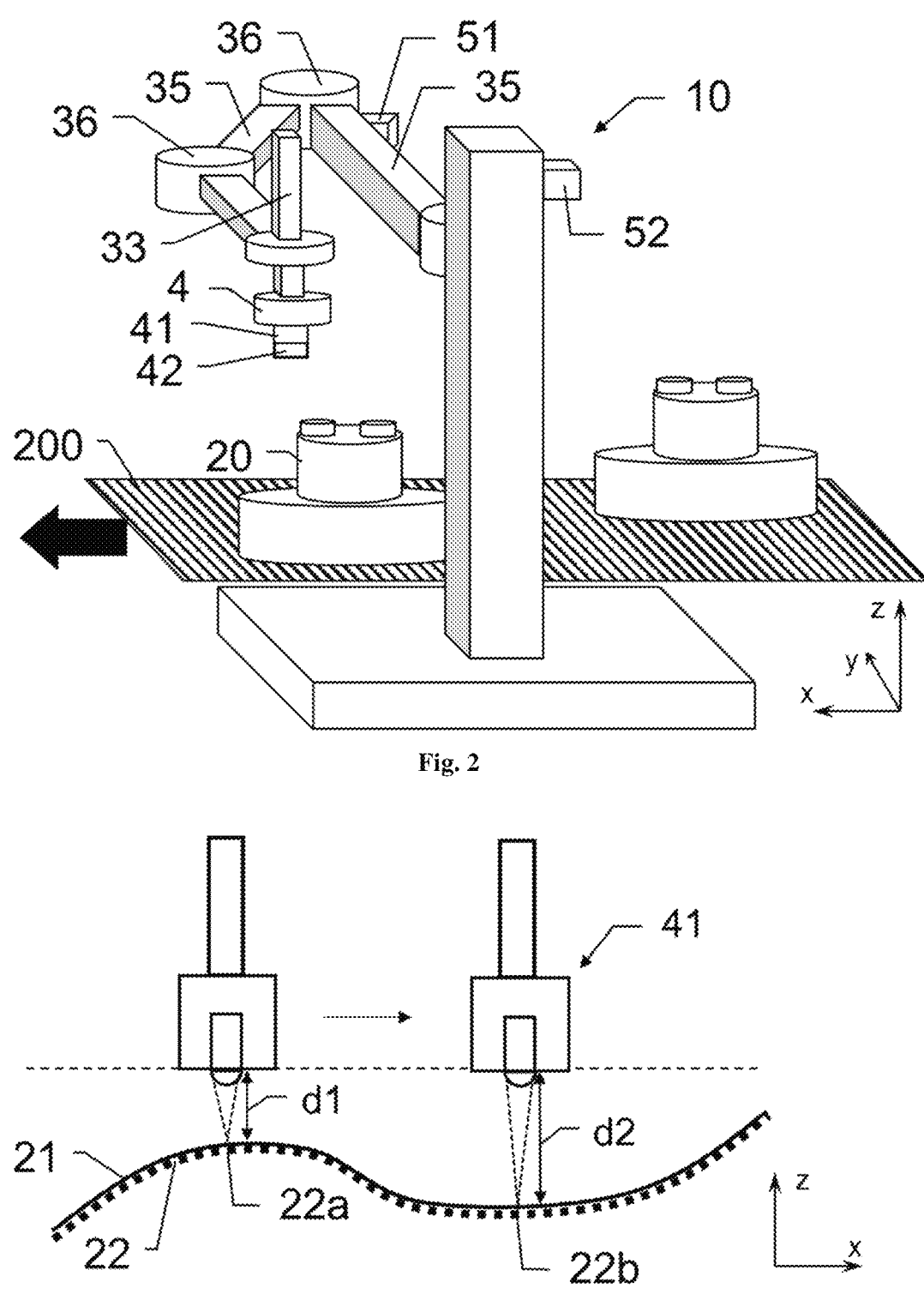
FIG. 2 shows the schematics of an embodiment of a CMM.
FIG. 3 depicts a measuring path comprising multiple measuring positions and a measuring process.

FIG. 2 depicts another typical embodiment of a CMM 10. The CMM 10 is embodied as an articulated arm coordinate measuring machine (AACMM), here a SCARA type machine. The depicted CMM 10 is placed next to a conveyor system 200, wherein the work pieces 20 are travelling towards the next station. The CMM 10 comprises arm segments 35 and joints 36, in particular motorized joints, to provide a relative lateral movement of the probe head 4 relative to the work piece 20. The joints 36 might provide further rotational degrees of freedom. These arm segments 35 joints 36 provide a machine structure to move the probe head 4.

In the embodiment depicted in FIG. 2 the distance between the probe head 4 and the work piece 20 is set by a distance adjustment arm segment 33 (z-ram) configured to set the distance. The CMM 10 should be understood as one particular embodiment of an AACMM. Of course, there are many additional but different embodiments well known to a skilled person. The disclosure should be understood to cover these alternatives as well.

The probe head 4 in the depicted embodiment is mounted on the distance adjustment arm segment 33. The probe head 4 carries an optical probe 41 which comprises a variable focal length lens 42 to provide precise distance measuring over a defined measuring range (in z-direction) by changing its focal length.

The CMM 10 further comprises an optical overview sensor unit having two cameras 51 and 52. A first 51 of the cameras is arranged on the moveable arm segment. The position of the first camera 51 can thus be derived by means of encoding or position detecting elements of the CMM 10. The second 52 of the cameras is mounted on a pedestal of the CMM 10 and is not moveable relative to the CMM base. Both cameras 51 and 52 are oriented so that their fields of view cover a common part of the conveyor system 200 on the right side of the pedestal of the CMM 10.

The optical overview sensor unit provides to acquire surface data related to the conveyor system 200 and the work piece 20 based in images captured with the two cameras making use of a stereo-photogrammetric processing of the image data. A respective stereo base and relative poses of the cameras 51 and 52 can be derived based on measuring the position of the first camera 51.

Due to movement of the work piece 20 surface information can be determined with different perspectives which allows to derive a point cloud representing (almost) the entire work piece 20. Movement of the probe head 4 and setting and varying a focal length of the optical probe can respectively controlled based on the surface information gathered with the optical sensor unit.

Controlling of the movement of the probe head 4 and of setting and varying the focal length of the optical probe 41 can be applied on-the-fly while moving the work piece 20 on the conveyor system 200. The conveyor system 200 does not have to be stopped at any point of such measuring procedure, i.e. neither for capturing imaged with the cameras 51 and 52 nor for accurately measuring or capturing one or more measuring points at the work piece 20 by means of the optical probe 41.

FIG. 3 shows a movement of an optical probe 41 of a CMM for accurately measuring a surface 21 of an object. A plurality of measuring points 22 to be measured are shown.

The measuring points 22 are related to the course and/or shape of the surface 21 and can be understood to provide a measuring path.

In contrast to measuring approaches known in the art, here a distance between the optical probe 41 and the surface 21 is not adjusted according to the course of the surface 21 to be kept basically constant but the distance varies, wherein a measuring distance to be applied is provided by varying the focal length of the variable focal length lens of the optical probe 41.

As for example, for measuring the measuring point 22a the distance between the optical probe 41 and the surface 21 corresponds to distance d1 and the variable focal length lens is controlled to provide a focal length corresponding to d1. When approaching or arriving at measuring point 22b the focal length is adjusted according to the distance d2 between the optical probe 41 and the surface 21 at the measuring point 22b while the optical probe 41 is moved on a constant level, i.e. the z-coordinate of the optical probe 41 (relative to the CMM or the base of the CMM) remains unchanged. By that, suitable focusing of measuring light can be provided for each of the measuring points 22 by means of (only) changing the focal length.

The coarse coordinates (auxiliary distance information), in particular a coarse height information, for each of the measuring points 22 is provided to the CMM to appropriately control the variable focal length lens for precise measurement. Such information is derived in advance of performing the precise measurement. The coarse coordinates may be derived based on an approach as described above, i.e. by means of an optical overview sensor unit arranged at the machine structure and configured to acquire surface information.

Figure 4:
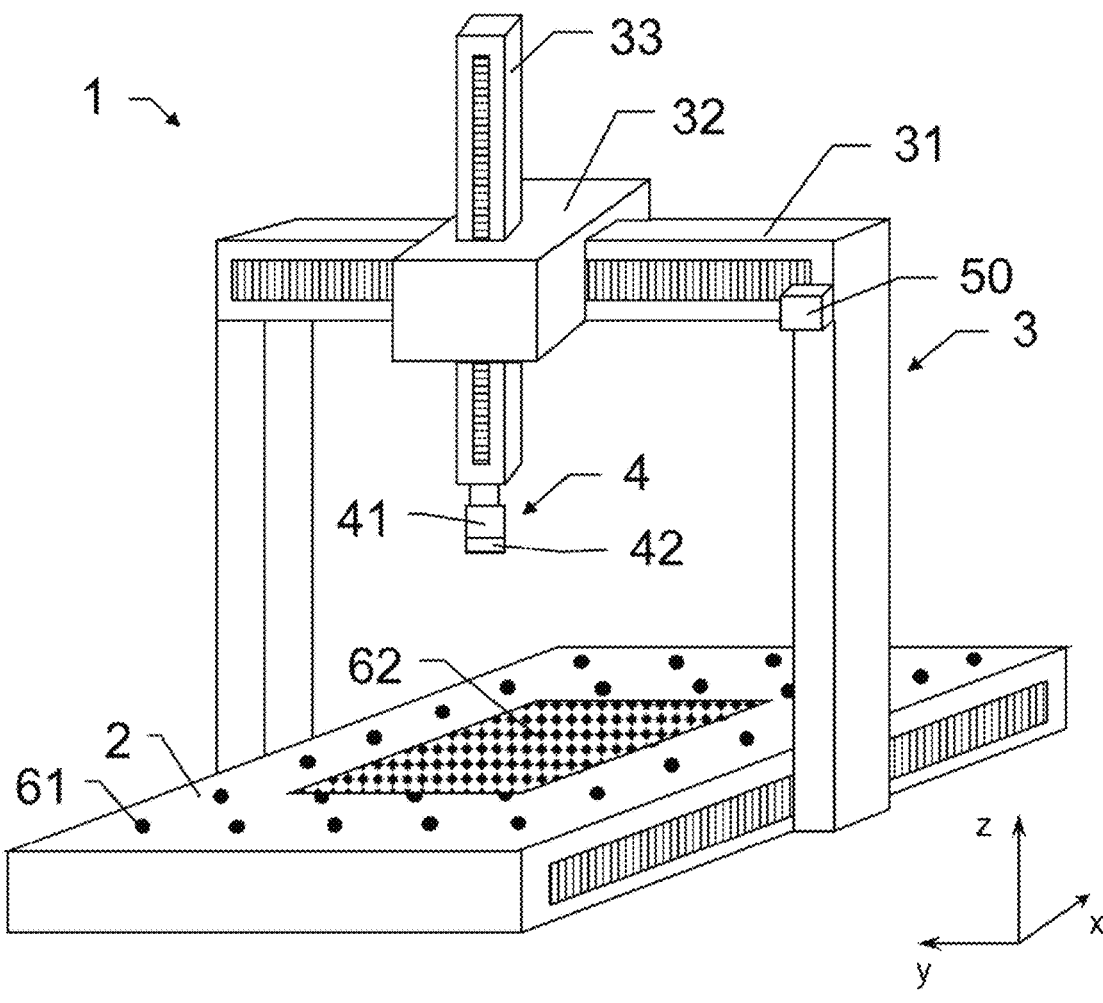
FIG. 4 shows an embodiment of a CMM.

FIG. 4 shows a coordinate measuring machine 1 which is built according to the CMM of FIG. 1. In contrast to the CMM of FIG. 1, the CMM here comprises a number of markers 61 on the measuring table. The markers 61 can be provided by boreholes in the table or may be provided by paintings.

The position of each of the markers 61 may be accurately known in a CMM coordinate system. The positions of the markers 61 can be determined by measuring by use of a tactile or optical sensor mounted to the probe head of the CMM.

The markers 61 and their positions can be utilized to calibrate the optical overview sensor unit 50 (e.g. comprising a camera or at least two cameras) arranged at the CMM.

For calibration, images of a calibration target 62 are captured from different poses relative to the target 62. The images are captured by the optical overview sensor unit 50 wherein the optical overview sensor unit 50 can provided at different positions, e.g. by externally providing the optical overview sensor unit 50 relative to the target or by arranging the calibration target 62 on the base 2 (as shown) and moving the frame 3. Based on the image information provided by the images intrinsic parameters for the optical overview sensor unit are calculated, e.g. by means of bundle adjustment.

In a next step, images which cover at least a part of the base 2 and at least a part of the calibration target 62 are taken by the optical overview sensor unit 50. These images are utilized to derive the extrinsic parameters of camera 50 relative to calibration target 62. In addition, the positions of the markers 62 (relative to the calibration target 62) which are covered by the images are determined in the images based on image processing.

Since the positions of the markers 61 are accurately known in a CMM coordinate system, in a next step the coordinate system of the optical overview sensor unit 50 and the coordinate system of the CMM 1 are referenced (aligned) relative to each other based on the marker coordinates (positions).

Alternatively or additionally, the markers 61 and their positions can be utilized to perform precise measurement of an object arranged at the CMM base 2. For that, an approach similar to aerial photogrammetry can be applied on a smaller scale.

The optical overview sensor unit 50 can be moved along a precise trajectory using the CMM machine structure 3 and encoder read-outs. Images can be taken at regular intervals during movement. A 3D-map of the base 2 and of objects on the base 2 can be generated based thereon.

The markers 61 in the images can be used as kind of "ground control points". This also allows an online calibration of camera extrinsic parameters. As a result, a relative measurement between the base 2 and an object to be measured is provided.

By such approach, the absolute accuracy of the measurement can be improved since camera drift, in particular concerning camera extrinsic parameters (angle and position), can be compensated by processing the positions of the markers and since the table plane (and thus the positions of the markers) has basically zero systematic error.

Figure 5:
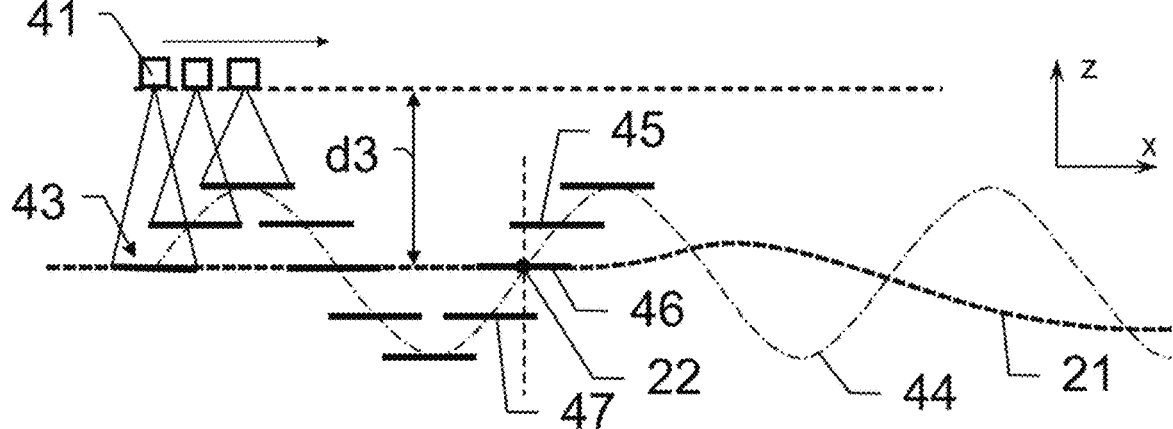
FIG. 5 shows an embodiment of a measuring approach for determining a distance to the object.

FIG. 5 shows a movement of an optical probe 41 of a CMM for accurately measuring a surface 21 of an object. Further, a variation of the focal length of a variable focal length lens of the probe is shown.

The optical probe 41 is moved over the surface 21 of the object in x-direction on a constant z-level, i.e. the z-position of the optical probe 41 does not change. However, the focal length of the variable focal length lens is changing while moving the probe 41. The variation of the focal length is provided by applying a defined signal function to the actuator of the probe 41.

The defined signal function can be in form of a sinusoidal function as shown here, but can alternatively be any other well-defined function. In particular, the signal can provide periodic change, e.g. by a saw-tooth function, or non-periodic change.

As shown here, the focal length wobbles around a focal length which corresponds to the distance d3 between the optical probe 41 and the surface 21. The focal length follows the sinusoidal function 44. The wobble function can be defined to follow the change of the distance d3 to the surface 21 so that the change of the focal length in both z-directions (positive and negative) relative to distance to the surface is basically the same. Alternatively, as shown here, the focal variation is kept unchanged while moving the probe, wherein the variation is preferably set so that the distance d3 to the surface 21 is between the maximum and the minimum of the varying focal length.

The focus wobble 44 is applied for determining a distance e.g. to the measuring point 22. The FOVs of several successive images overlap, e.g. 45-47. The combination of the focus wobble and the overlapping images provides that the measuring point 22 is imaged in multiple acquisitions with different focus settings (indicated by 45, 46 and 47).

The sharpest image can be selected for further image processing and e.g. determination of 2D coordinates (x- and y-coordinates) of the measuring point 22. Furthermore, the sharpness can be determined as a function of the z-distance by e.g. contrast evaluation. This allows for calculating (interpolating) of the distance of the measuring point 22 in z-direction (1D z-coordinate) with high accuracy.

Although aspects are illustrated above, partly with reference to some specific embodiments, it must be understood that numerous modifications and combinations of different features of the embodiments can be made. All of these modifications lie within the scope of the appended claims.

The invention claimed is:

1. A coordinate measuring machine for measuring a number of measuring points on a surface, the coordinate measuring machine comprising:
    a base,
    a probe head with an optical probe,
    a machine structure with structural components for linking the probe head to the base,
    at least one drive mechanism for providing movability of the machine structure and of the probe head relative to the base,
    at least one encoding unit configured to provide positional data concerning a position of the machine structure and/or of the probe head relative to the base,
    an optical overview sensor unit arranged at the machine structure and configured to acquire surface information, the optical overview sensor unit provides a field of view which is significantly greater than the field of view of the optical probe, and
    a controlling and processing unit that includes a processor and that is adapted at least for controlling the drive mechanism,
    the optical probe comprising:
        an optical detection unit, in particular a sensor,
        a variable focal length lens modifying its focal length, and
        an actuating unit configured and arranged relative to the variable focal length lens so that the actuating unit provides setting and varying the focal length as a function of a controlling signal, wherein the actuating unit includes at least one of a mechanical unit or an electronic unit,
    the controlling and processing unit comprises a measuring functionality configured to derive auxiliary distance information and effective surface information for measuring points, wherein the auxiliary distance information is derived by:
        controlling the optical overview sensor unit as to acquire surface information related to at least one point of the number of measuring points, and
        determining the auxiliary distance information related to the at least one measuring point based on the surface information, and
    wherein the effective surface information is derived by:
        deriving a controlling signal based on the auxiliary distance information,
        providing an adjusted measuring state of the optical probe by applying the controlling signal to the actuating unit and thus providing a distance-related focal length, and
        determining the effective surface information for the at least one measuring point by means of the optical probe in the adjusted measuring state.

2. The coordinate measuring machine according to claim 1, wherein the measuring functionality is configured so that deriving the auxiliary distance information comprises:
    controlling the optical overview sensor unit as to acquire second surface information related to a second of the number of measuring points, and determining second auxiliary distance information related to the second measuring point based on the second surface information.

3. The coordinate measuring machine according to claim 2, wherein the measuring functionality is configured so that deriving the effective surface information comprises:

deriving a second controlling signal based on the second auxiliary distance information, providing a second adjusted measuring state of the optical probe by applying the second controlling signal to the actuating unit and thus providing a distance-related focal length, and determining second effective surface information for the second measuring point by means of the optical probe in the second adjusted measuring state.

4. The coordinate measuring machine according to claim 1, wherein the measuring functionality is configured to perform deriving the auxiliary distance information before deriving the effective surface information.

5. The coordinate measuring machine according to claim 1, wherein the measuring functionality is configured to provide—by means of the drive mechanism—the optical overview sensor unit at a first position relative to the base and to derive the auxiliary distance information based on surface information acquired at the first position.

6. The coordinate measuring machine according to claim 1, wherein the measuring functionality is configured to:

provide—by means of the drive mechanism—the optical overview sensor unit successively at least at a first and at a second position relative to the base, derive the auxiliary distance information by:

acquiring surface information related to the one point of the number of measuring points at least at the first and the second position and determine the auxiliary distance information related to the one measuring point based on the surface information acquired at least at the first and at the second position.

7. The coordinate measuring machine according to claim 6, wherein the measuring functionality is configured to:

derive positional data concerning the at least first position and second position of the optical overview sensor unit relative to the base by means of the encoding unit, assign the respective positional data to the respective surface information for the at least first and second position of the optical overview sensor unit, and determine the auxiliary distance information by processing the positional data and surface information, wherein:

the optical overview sensor unit comprises at least one camera, in particular two cameras, and the auxiliary distance information is provided as a height map by means of photogrammetric processing.

8. The coordinate measuring machine according to claim 1, wherein:

the base comprises a set of reference points with known positions, in particular provided by threads of a measuring table, and at least one of the reference points is covered by the acquired surface information and the position of the at least one reference point is processed for determining the auxiliary distance information and/or for calibrating the optical overview sensor unit, wherein extrinsic parameters of the optical overview sensor unit are calibrated or updated.

9. The coordinate measuring machine according to claim 1, wherein the controlling and processing unit comprises an auxiliary-measuring functionality configured to provide the auxiliary distance information by:

moving the optical overview sensor unit over the surface, acquiring surface information related to the surface at a plurality of positions provided by moving the optical overview sensor unit and determining auxiliary distance information related to the surface based on the surface information, wherein the auxiliary distance information comprises particular distance information for each of the number of measuring points, wherein the auxiliary-measuring functionality is a sub-functionality of the measuring functionality and is executed by the measuring functionality.

10. The coordinate measuring machine according to claim 1, wherein the controlling and processing unit comprises an effective-measuring functionality configured to provide the effective surface information by:

moving the optical probe over the surface according to a measuring path, wherein the optical probe is successively approached to a first and to a second measuring point, receiving or deriving a first controlling signal related to the first measuring point and a second controlling signal related to the second measuring point, in the course of approaching the first measuring point:

providing a first adjusted measuring state of the optical probe by applying the first controlling signal to the actuating unit, and determining the effective surface information for the first measuring point by means of the optical probe in the first adjusted measuring state, and in the course of approaching the second measuring point:

providing a second adjusted measuring state of the optical probe by applying the second controlling signal to the actuating unit, and determining the effective surface information for the second measuring point by means of the optical probe in the second adjusted measuring state.

11. The coordinate measuring machine according to claim 10, wherein:

the effective-measuring functionality is configured to:

continuously move the optical probe over the surface according to the measuring path and provide applying the first and/or the second controlling signal and determining the effective surface information for the first and/or second measuring point in the course of, in particular during, moving the optical probe, and/or the effective-measuring functionality is configured to:

provide tilting of an optical axis of the optical probe relative to a normal related to the first measuring point and relative to a normal related to the second measuring point, capture at least one tilted image as the effective surface information for each measuring point and covering a common feature with the tilted images, each tilted image provides the common feature with different sharpness, determining a best-sharpness value for the common feature based on the tilted images, derive distance information based on the controlling signals applied for capturing the tilted images and based on the best-sharpness value.

12. The coordinate measuring machine according to claim 1, wherein the optical probe comprises a telecentric lens system and the controlling and processing unit comprises a distance-measuring functionality configured to derive distance data for at least one point of the number of measuring points by:

moving the optical probe over the surface according to the auxiliary distance information, varying the focal length during moving of the optical probe by providing the controlling signal as a modified controlling function, capturing a set of at least three images during moving of the optical probe as the effective surface information, wherein varying the focal length and capturing the images are adjusted to each other so that each image covers the at least one point of the number of measuring points and each image provides a different focus level for the at least one point of the number of measuring points, determining a distance image of the set of at least three images by image processing using a contrast criterion, and deriving the distance based on the focal length applied for capturing the distance image, in particular by interpolating the focal lengths applied for capturing the set of at least three images.

13. A method for calibrating an optical overview sensor unit of a coordinate measuring machine of claim 1, wherein the method comprises:

providing a calibration target, taking a set of images of the calibration target from different poses by means of the optical overview sensor unit, deriving extrinsic parameters for the optical overview sensor unit by processing the set of images, providing the calibration target on the base of the coordinate measuring machine, wherein the base is provided as a measuring table having a set of reference points with known positions, in particular provided by threads of a measuring table, capturing at least one reference image which covers at least a part of the calibration target and at least one of the reference points, computing extrinsic parameters for the optical overview sensor unit relative to the calibration target by processing the at least one reference image, deriving a sensor image position of the at least one of the reference points based on the at least one reference image, the sensor position is provided as a coordinate in a camera coordinate system of the optical overview sensor unit, receiving or deriving a reference position for the at least one of the reference points, the reference position is provided as a coordinate in a CMM coordinate system of the coordinate measuring machine, and referencing the camera coordinate system and the CMM coordinate system by processing the sensor position and the reference position.

14. A computer program product stored in a non-transitory machine readable medium, which, when executed by a computing unit and/or a controller, causes the automatic execution and controlling of the steps of the method according to claim 13.

15. The coordinate measuring machine according to claim 1, wherein the actuating unit includes at least one of an electro-wetting liquid lens, a liquid crystal spatial light modulator, or a MEMS mirror array.

16. A controller for a coordinate measuring machine, the coordinate measuring machine comprising:

a base having a set of reference points with known positions, in particular provided by threads of a measuring table, a probe head with an optical probe, a machine structure with structural components for linking the probe head to the base, at least one drive mechanism for providing movability of the machine structure and of the probe head relative to the base, at least one encoding unit configured to provide positional data concerning a position of the machine structure and/or of the probe head relative to the base, and an optical overview sensor unit arranged at the machine structure and configured to acquire surface information, the optical overview sensor unit provides a field of view which is significantly greater than the field of view of the optical probe, the controller being at least configured to control the drive mechanism, the controller further being configured to control:

capturing at least one reference image by means of the optical overview sensor unit which reference image covers at least a part of a calibration target provided on the base and at least one of the reference points, computing extrinsic parameters for the optical overview sensor unit relative to the calibration target by processing the at least one reference image, deriving a sensor image position of the at least one of the reference points based on the at least one reference image, the sensor position is provided as a coordinate in a camera coordinate system of the optical overview sensor unit, receiving or derive a reference position for the at least one of the reference points, the reference position is provided as a coordinate in a CMM coordinate system of the coordinate measuring machine, and referencing the camera coordinate system and the CMM coordinate system by processing the sensor position and the reference position.

\* \* \* \* \*